Feb. 15, 1944.    G. M. KRIEGBAUM ET AL    2,341,795
PLANTER
Filed Aug. 20, 1941    2 Sheets-Sheet 1
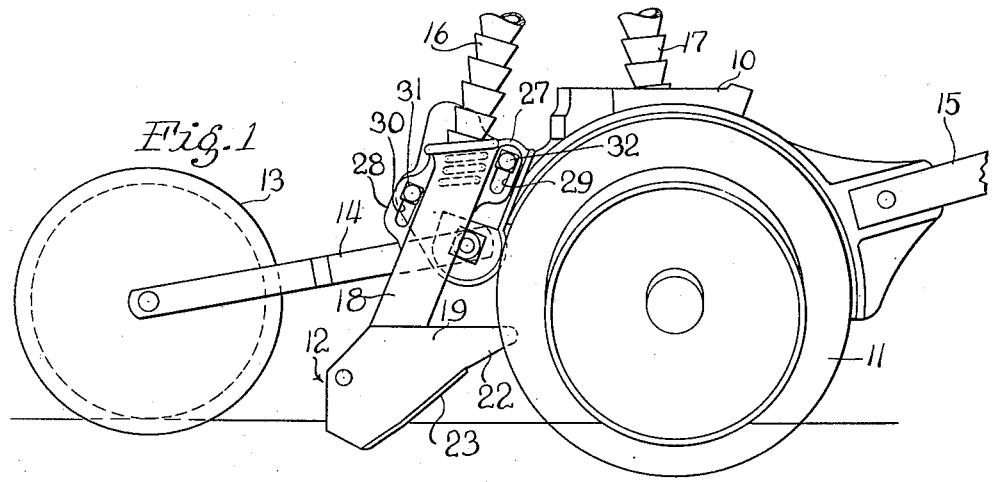
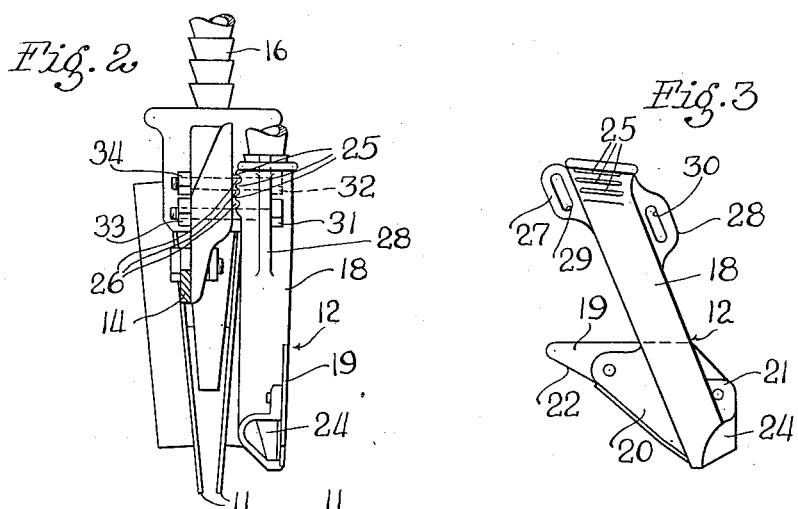
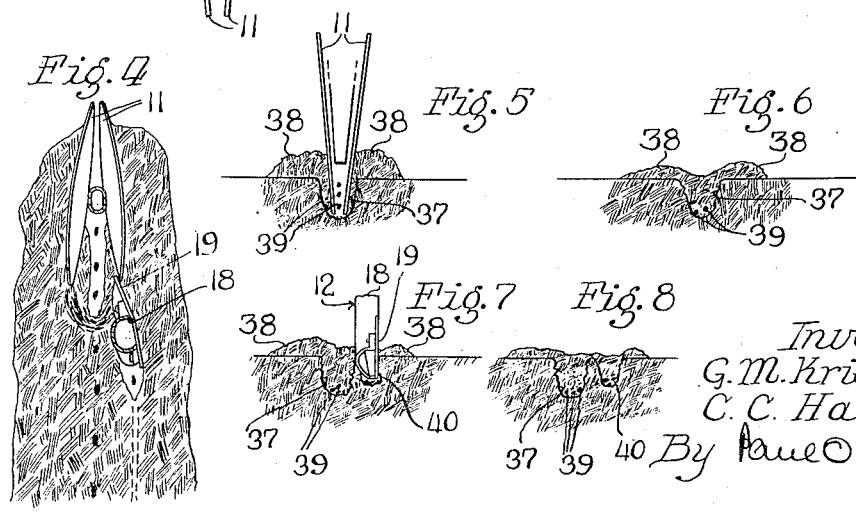
Inventors
G. M. Kriegbaum
C. C. Haas
By Paul O. Pippel
Atty.

Feb. 15, 1944.   G. M. KRIEGBAUM ET AL   2,341,795
PLANTER
Filed Aug. 20, 1941   2 Sheets-Sheet 2
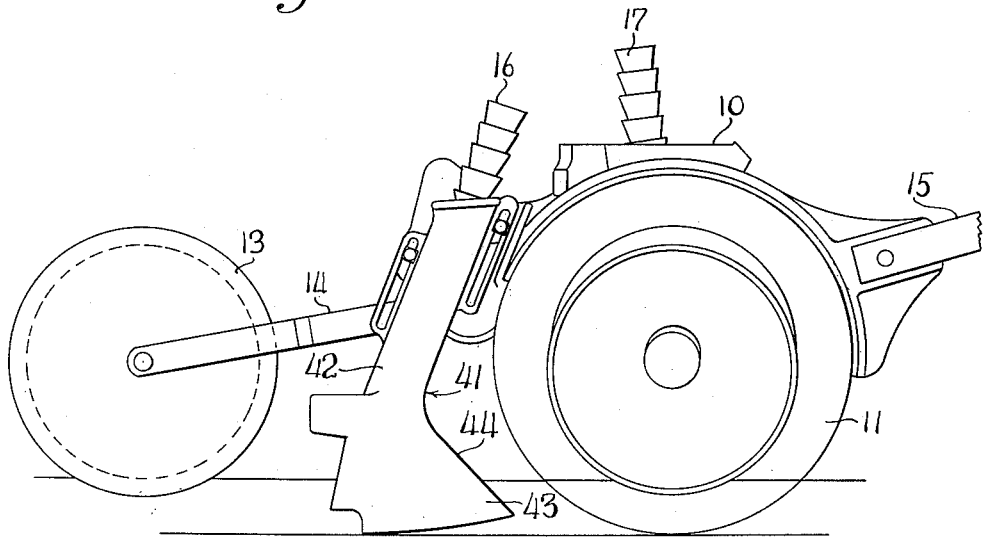
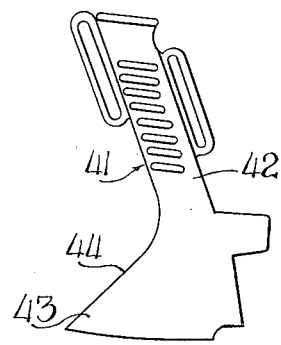

Patented Feb. 15, 1944

2,341,795

UNITED STATES PATENT OFFICE 2,341,795

PLANTER

George M. Kriegbaum and Clarence C. Haas, Richmond, Ind., assignors to International Harvester Company, a corporation of New Jersey Application August 20, 1941, Serial No. 407,556

18 Claims. (Cl. 111—85)

This invention relates to a planter construction. More specifically it relates to a construction for forming separate furrows for seed and fertilizer.

Many constructions have been devised for depositing seed and fertilizer from separate means and in separate furrows. However, it is very difficult to deposit seed and fertilizer in separate rows which are at the proper spacing and at the proper depth relative to one another for the fertilizer to exert the desired effect on the seed.

An object of the present invention is to provide an improved planter construction.

A further object is the provision of an improved construction for forming separate furrows for fertilizer and seed.

Another object is to provide a planter comprising furrow disks and a shoe with vertical adjustment of the shoe with respect to the furrow disks.

A still further object is the provision of a planter comprising furrow disks and a shoe with lateral adjustment of the shoe with respect to the furrow disks.

According to the present invention, a shoe is mounted behind a pair of furrow disks in such a way as to form a furrow to one side of the furrow formed by the disks. The front sloping edge of the shoe is sufficiently elevated and rearward of the disks so as not to prevent dirt along the sides of the furrow formed by the disks from falling into the furrow after passage of the disks.

In the drawings:

Figure 1 is a side view of the planter construction of the present invention;

Figure 2 is a rear view thereof;

Figure 3 is a side view of the shoe forming part of the planter construction;

Figure 4 is a plan view of the planter construction showing how it forms furrows;

Figure 5 shows the disks of the planter construction forming a furrow;

Figure 6 shows the completion of the furrow formed by the disks after the disks have passed;

Figure 7 shows the furrow formed by the disks and a furrow being formed by the shoe;

Figure 8 shows the two furrows after the shoe has passed;

Figure 9 is a side view of a modified planter construction; and

Figure 10 is a side view of the shoe of the modified planter construction.

The planter construction of the present invention comprises a support 10 formed as a casting, a pair of closely spaced furrow disks 11 rotatably mounted on the support 10, and a shoe 12. A covering wheel 13 is positioned to the rear of the shoe 12 and is connected with the support 10 by means of a member 14. The planter construction may be pivotally supported on a frame, not shown, by means of a member 15, so as to be capable of being moved between a raised transport position and a lowered working position. Flexible tubes 16 and 17 are connected, respectively, with the shoe 12 and with the support 10 for feeding between the disks 11. The tubes are to feed fertilizer and seed as will be described later.

The shoe 12 is composed of a tube 18 and a generally triangular-shaped plate 19 secured to flanges 20 and 21 formed integral with the tube 12. A lower forward edge 22 of the plate 19 rests on a lower forward edge 23 formed as a shoulder on the flange 20 and extends upwardly and forwardly beyond the edge 22 into the space between the rear edges of the disks 11. The discharge opening for the shoe 12 is indicated at 24. As seen in Figures 2 and 3, there is a vertical series of spaced horizontally extending teeth 25 adjacent the upper end of the tube 18. A tooth 26 formed on the support 10 fits into any space between the teeth 25. Wings 27 and 28 formed integral with tube 18 have vertical slots 29 and 30 through which pass bolts 31 and 32 that with the aid of nuts 33 and 34 secure the shoe 12 to the support 10, the head of the bolts resting against the wings 27 and 28.

Vertical adjustment of the shoe 12 with respect to the support 10 and the furrow disks 11 is accomplished by causing a different space between the teeth 25 on shoe 12 to engage the tooth 26 on the support 10, the bolts 31 and 32 being loosened sufficiently to permit the teeth 25 to become disengaged from the tooth 26. Lateral adjustment of the shoe 12 is effected with the tooth 26 as a pivot. As seen in Figure 2, the shoe is offset from the disks 11. For more offset, the bolt 31 is loosened, and the bolt 32, tightened, the shoe being thereby caused to pivot about the tooth 26. For less offset, the bolt 31 is tightened, and the bolt 32 loosened.

The drawings show the shoe 12 to form a shallower furrow than that formed by the disks 11. Figure 5 shows a deep furrow 37 and ridges 38 formed by the furrow disks 11 and seed 39 being passed from the tube 17 between the disks 11. Figure 6 shows the furrow 37 after the disks 11 have passed. Parts of the ridges 38 have fallen into the furrow 37, covering the seed 39. Figure 7 shows the shoe 12 forming a furrow 40 shallower than the furrow 37 and to one side thereof, fertilizer being deposited by the shoe 12 as the furrow 40 is formed. The shoe 12 passes very close to the furrow 37 so as to pass through one ridge 38, causing a portion thereof to fall in the furrow 37. Figure 8 shows the furrows 37 and 40 after both the disks 11 and the shoe 12 have passed. If desired, the shoe 12 may be lowered so that the furrow 40 will be deeper than the furrow 37. Furthermore, if desired, fertilizer may be deposited between the disks 11, and seed, by the shoe 12.

It will be noted from Figure 1 that the forward sloping cutting edge of the shoe 12 formed by the edge 22 on the plate 19 and the edge 23 on the plate 20 engages the ground somewhat to the rear of disks 11 and is, except for the very front tip of the plate 22, to the rear of the disks 11 at the same level. Thus, as viewed in Figure 1, there is a generally triangular space formed by the ground line, the lower rear edge of the disks 11 and the front edge of the shoe 12. The front edge of the shoe engages the ground at a point spaced well to the rear of the ground engaged by the disks 11. Thus, because of this space the ridge 38 at the side of the shoe 12 has an opportunity to fall into the furrow 37 in the interim between the passage of the disks 11 and the arrival of the edge of the shoe 12, thereby covering the seed 39. If the shoe 12 were much closer to the disks 11, dirt from the ridges 38 might not have a chance to fall into the furrow 37, and the shoe might not dig a separate furrow 40 but might simply follow directly in the furrow 37. Thus, the seed and fertilizer would be deposited together.

In the modified form of Figures 9 and 10 there is a shoe 41 composed of a tube 42 and a V-shaped member 43 secured to the lower end of the tube 42. The member presents a forward edge 44 which slopes upwardly and rearwardly and is spaced rearwardly from the rear edges of the disks 11 sufficiently so that part of the ridges 38 may fall into the furrow 37, as in the case with the use of the construction of Figure 1. The form of Figures 9 and 10 contrasts with that of Figure 1 in that the front edge of the shoe slopes upwardly and rearwardly, rather than upwardly and forwardly. It has been found that the form of Figures 9 and 10 functions better under certain soil conditions.

It will be apparent from the foregoing description that a new and novel planter construction has been devised by which separate furrows for fertilizer and seed are formed. By the proper spacing of a shoe for forming one furrow behind a pair of disks for forming the other furrow, the partial filling in of the furrow formed by the disks is permitted before the formation of the furrow by the shoe, and thus the formation of two separate furrows is assured. The second furrow is close enough to the first furrow so as to cut through the ridge formed with the first furrow and thereby fill in the first furrow. The vertical adjustment and the lateral adjustment of the shoe with respect to the disks are effected by specially formed means, and thereby the furrow formed by the shoe may be made shallower or deeper than or of the same depth of the furrow formed by the disks and may be shifted laterally with respect to the furrow formed by the disks.

The intention is to limit the invention only within the scope of the appended claims.

What is claimed is:

1. A construction for forming separate furrows for seed and fertilizer comprising supporting means, a pair of closely spaced disks rotatably mounted on the supporting means so as to form a first furrow and a ridge to one side thereof, and a shoe mounted on the supporting means to the rear of the furrow disks so as to form a second furrow to one side of the first furrow and in the ridge, the shoe having a front edge engaging the ground at a point sufficiently rearward of rearwardmost points on the disks at ground level to allow dirt from the sides of the first furrow to fall thereinto after passage of the furrow disks without interference from the shoe.

2. A construction for forming separate furrows for seed and fertilizer comprising supporting means, a pair of closely spaced disks rotatably mounted on the supporting means so as to form a first furrow and a ridge to one side thereof, and a shoe mounted on the supporting means to the rear of the furrow disks so as to form a second furrow to one side of the first furrow and in the ridge, the shoe having a front edge sloping upwardly and forwardly and engaging the ground at a point sufficiently rearward of rearwardmost points on the disks at ground level to allow dirt from the sides of the first furrow to fall thereinto after passage of the furrow disks without interference from the shoe.

3. A construction for forming separate furrows for seed and fertilizer comprising supporting means, a pair of closely spaced disks rotatably mounted on the supporting means so as to form a first furrow and a ridge to one side thereof, and a shoe mounted on the supporting means to the rear of the furrow disks so as to form a second furrow to one side of the first furrow and in the ridge, the shoe having a front edge sloping upwardly and rearwardly and engaging the ground at a point sufficiently rearward of rearwardmost points on the disks at ground level to allow dirt from the sides of the first furrow to fall thereinto after passage of the furrow disks without interference from the shoe.

4. A construction for forming separate furrows for seed and fertilizer, comprising supporting means, a pair of closely spaced disks rotatably mounted on the supporting means so as to form a first furrow, and a shoe mounted on the supporting means to the rear of the furrow disks so as to form a second furrow to one side of the first furrow, the shoe having a front edge sloping upwardly and forwardly and being sufficiently rearward of rearwardmost points on the disks to allow dirt from the sides of the first furrow to fall thereinto after passage of the furrow disks without interference from the shoe.

5. The construction specified in claim 4, the shoe being mounted on the supporting means for vertical adjustment with respect thereto whereby the shoe may form a furrow shallower than, at the same level as, or deeper than the furrow formed by the disks.

6. The construction specified in claim 4, the shoe being mounted on the supporting means for lateral adjustment of the lower end of the shoe whereby the lateral spacing between the furrow formed by the shoe and that formed by the furrow disks may be varied.

7. The construction specified in claim 4, the shoe being mounted on the supporting means for vertical adjustment of the shoe and for lateral adjustment of the lower end thereof, whereby the depth of the furrow formed by the shoe may be adjusted with respect to the furrow formed by the disks, and the lateral spacing of the furrows may be varied.

8. A construction for forming separate furrows for seed and fertilizer, comprising supporting means, a pair of closely spaced disks rotatably mounted on the supporting means for forming a first furrow, a shoe for forming a second furrow, and means mounting the shoe on the supporting means for lateral adjustment of the lower end thereof with respect to the disks, said means comprising means pivotally mounting on the supporting means a portion of the shoe spaced from the lower end thereof.

9. A construction for forming separate furrows for seed and fertilizer, comprising supporting means, a pair of closely spaced disks rotatably mounted on the supporting means for forming a first furrow, a shoe for forming a second furrow, and means mounting the shoe on the supporting means for lateral adjustment of the lower end thereof with respect to the disks, said means comprising means pivotally mounting on the supporting means a portion of the shoe spaced from the lower end thereof, and securing means mounted on opposite sides of the pivotally mounting means, adjustment of the lower end of the shoe being effected by tightening of the securing means on the side of the pivotally mounting means and loosening of the securing means on the other side of the pivotally mounting means.

10. A construction for forming separate furrows for seed and fertilizer, comprising a supporting member, a pair of closely spaced disks rotatably mounted on the supporting means for forming a first furrow, a shoe member for forming a second furrow, and means adjustably mounting the shoe member on the supporting member for vertical adjustment of the shoe member with respect to the furrow disks, said means comprising a tooth on one member and a plurality of spaced teeth on the other member, the tooth on the one member being adapted to fit in any of the spaces between the teeth on the other member.

11. The construction specified in claim 10, the teeth on the one member being arranged in a vertical row, and there being a pivoting of the one member with respect to the other by virtue of the fit of the tooth on the other member within the space between the teeth on the one member, by which a lateral adjustment of the shoe with respect to the furrow disks is effected.

12. The construction specified in claim 10, the teeth on the one member being arranged in a vertical row, and there being a pivoting of the one member with respect to the other by virtue of the fit of the tooth on the other member within the space between the teeth on the one member, by which a lateral adjustment of the shoe with respect to the furrow disks is effected, the construction including securement means acting between the members on the opposite sides of the one tooth in the said other member, tightening of one securement means on one side of the tooth and loosening of the securement means on the other side of the tooth effecting the aforesaid lateral adjustment of the shoe member.

13. A construction for forming separate furrows for seed and fertilizer, comprising a supporting member, a pair of furrow disks rotatably mounted on the supporting member for forming a first furrow, a shoe member for forming a second furrow, means mounting the shoe member on the supporting member for vertical adjustment and lateral adjustment of the shoe, comprising a horizontally extending tooth on one member, a vertical series of spaced horizontally extending teeth on the one member, a horizontally extending tooth on the other member fitting into any of the spaces between the teeth on the other member, vertical adjustment of the shoe member being effected by causing the tooth on the said other member to be shifted from one space between the teeth on the said one member to another space between the teeth, a pair of vertically extending slots in the said one member, a pair of bolts secured to the said other member on opposite sides of the tooth on the said other member and passing through the slots and securing the members together, lateral adjustment of the shoe member being effected by tightening of one bolt and loosening of the other bolt.

14. A construction for forming separate furrows for seed and fertilizer comprising supporting means, a pair of closely spaced disks rotatably mounted on the supporting means so as to form a first furrow and a ridge to one side thereof, and means mounted on the supporting means to the rear of the furrow disks so as to form a second furrow to one side of the first furrow and in the ridge, the means having a front edge sufficiently rearward of the rearwardmost points on the disks adjacent ground level to allow dirt from the sides of the first furrow to fall thereinto after passage of the furrow disks without interference from the means.

15. A construction for forming separate furrows for seed and fertilizer comprising supporting means, a pair of closely spaced disks rotatably mounted on the supporting means so as to form a first furrow and a ridge to one side thereof, and means mounted on the supporting means to the rear of the furrow disks so as to form a second furrow to one side of the first furrow and in the ridge, the means having a front edge sloping upwardly and forwardly sufficiently rearward of rearwardmost points on the disks adjacent ground level to allow dirt from the sides of the first furrow to fall thereinto after passage of the furrow disks without interference from the means.

16. A construction for forming separate furrows for seed and fertilizer comprising supporting means, a pair of closely spaced disks rotatably mounted on the supporting means so as to form a first furrow, and means mounted on the supporting means to the rear of the furrow disks so as to form a second furrow to one side of the first furrow, the means having a front edge sloping upwardly and forwardly from a lowest point spaced to the rear of the disks to a highest point forward of the rear edge of the disks and above the ground and being for the most part sufficiently rearward of rearwardmost points on the disks near ground level to allow dirt from the sides of the first furrow to fall thereinto after passage of the furrow disks without interference from the means.

17. A construction for forming separate furrows for seed and fertilizer comprising supporting means, a pair of closely spaced disks rotatably mounted on the supporting means so as to form a first furrow, and a shoe mounted on the supporting means to the rear of the furrow disks so as to form a second furrow to one side of the first furrow, the shoe having a portion spaced from the ground between the disks and an upwardly and forwardly sloping front edge engaging the ground at a point sufficiently rearward of rearwardmost points on the disks at ground level to allow dirt from the sides of the first furrow to fall thereinto after passage of the furrow disks without interference from the shoe.

18. A construction for forming separate furrows for seed and fertilizer comprising supporting means, a pair of closely spaced disks rotatably mounted on the supporting means so as to form a first furrow and a ridge to one side thereof, and a shoe mounted on the supporting means to the rear of the furrow disks so as to form a second furrow to one side of the first furrow and in the ridge, the shoe having a portion spaced from the ground between the disks and an upwardly and forwardly sloping front edge engaging the ground sufficiently rearward of rearwardmost points on the disks at ground level to allow dirt from the sides of the first furrow to fall thereinto after passage of the furrow disks without interference from the shoe.

GEORGE M. KRIEGBAUM.
CLARENCE C. HAAS.